Aug. 15, 1944.　　　K. H. HACHMUTH　　　2,355,857
HYDROGEN HALIDE RECOVERY
Filed March 10, 1942
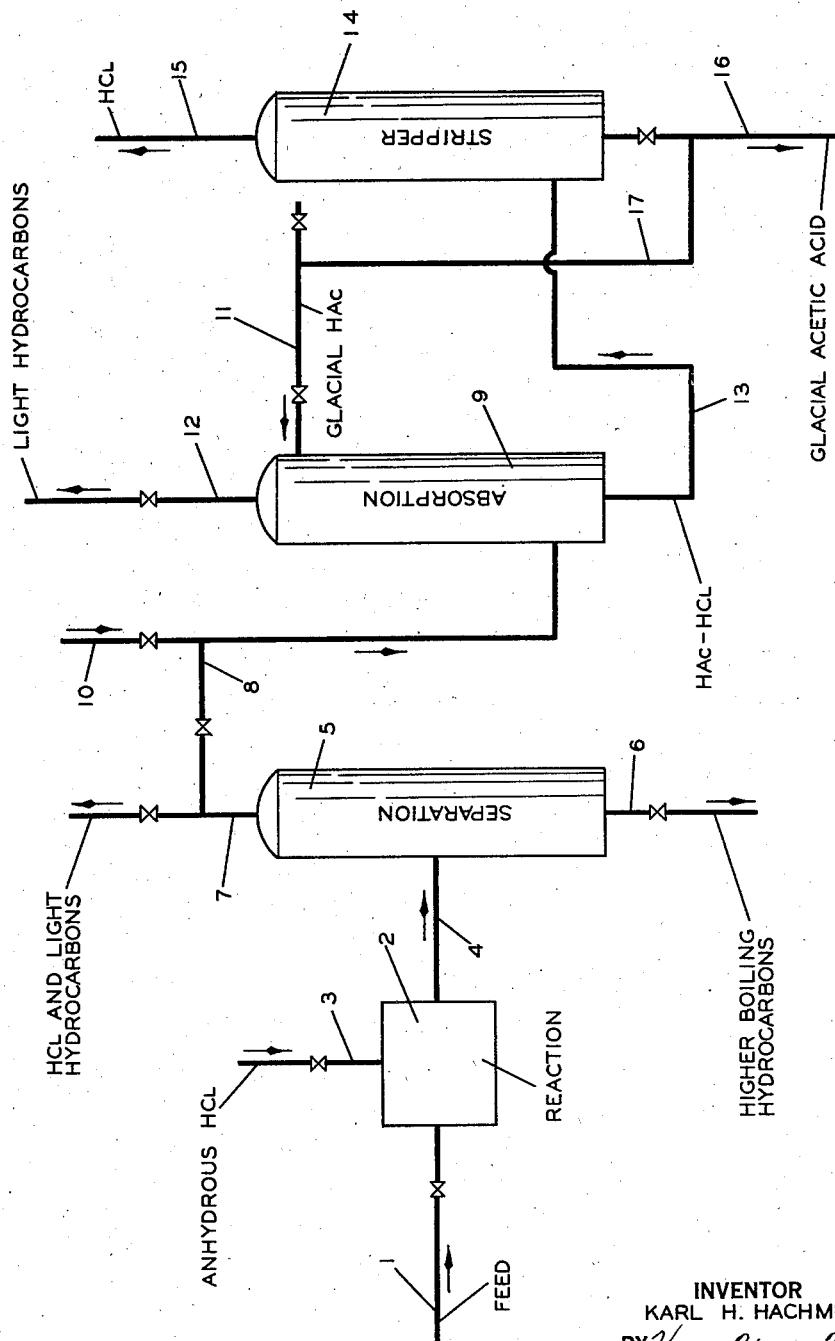
INVENTOR
KARL H. HACHMUTH
BY
ATTORNEY Patented Aug. 15, 1944

2,355,857

UNITED STATES PATENT OFFICE 2,355,857

HYDROGEN HALIDE RECOVERY

Karl H. Hachmuth, Bartlesville, Okla., assignor to Phillips Petroleum Company, a corporation of Delaware Application March 10, 1942, Serial No. 434,125

4 Claims. (Cl. 23—153)

This invention relates to the recovery of anhydrous hydrogen halide from admixture with light hydrocarbons and especially to the recovery of anhydrous hydrogen chloride from a hydrocarbon conversion process, such as processes for the alkylation or isomerization of hydrocarbons such as paraffins and olefins wherein anhydrous hydrogen chloride is commingled with reactants in the conversion zone.

In many arts and especially in the field of hydrocarbon conversion such as dehydrohalogenation, alkylation, isomerization, etc., anhydrous hydrogen halide, generally hydrogen chloride, is present in the reaction effluent in admixture with light hydrocarbons of such boiling point that they can be separated from the hydrogen halide only with great difficulty, and at great expense. In most cases separation by fractional distillation is out of the question because of the excessive expense involved and because of the amounts of refrigeration required for liquefaction and the closeness of the boiling points of the components of the mixture. Also frequently azeotropes of the hydrogen halide and the light hydrocarbons are formed which make impossible the separation of the components by ordinary means.

For example, in isomerization and alkylation processes using anhydrous hydrogen chloride as a promoter for the metal halide catalyst such as aluminum chloride, the light hydrocarbons formed and the anhydrous hydrogen chloride are separated from the remainder of the materials. In recycling the hydrogen chloride, a portion of the stream must be vented to prevent too great an accumulation of the lighter hydrocarbons. In the past the hydrogen chloride in the vent stream was either wasted or recovered as aqueous hydrochloric acid which cannot be reused in the process. Also it has been common to remove anhydrous hydrogen halide from admixture with hydrocarbons by giving the mixture an alkali wash. This wastes both alkali and the hydrogen halide. My invention comprises a process for the recovery of the hydrogen chloride in an anhydrous state which permits its reuse in the process.

In numerous other processes, there are obtained fractions including anhydrous hydrogen halide and hydrocarbons which are either normally gaseous or for other reason difficult or impossible to separate from the hydrogen halide by known methods.

Thus, in the dehydrohalogenation of halogenated hydrocarbons to produce unsaturated hydrocarbons such as is used in the manufacture of aliphatic conjugated diolefins, the reaction effluent may consist of a mixture of anhydrous hydrogen halide and the unsaturated hydrocarbon, such as for example a mixture of HCl and butadiene-1-3.

My invention may be applied to the processes mentioned above and to other processes wherein it is desired to resolve a mixture of anhydrous hydrogen halide and a hydrocarbon which may be normally gaseous or have a boiling point close to that of the hydrogen halide or for other reason be difficult to separate therefrom by conventional methods.

The principal object of my invention therefore is to provide an improved process for the separation of anhydrous hydrogen halide from admixture with hydrocarbon.

Another object is to provide an improved method of separation of anhydrous hydrogen halide which is normally gaseous, from admixture with normally gaseous hydrocarbon, especially normally gaseous hydrocarbons of petroleum and natural gas origin such as the lighter paraffins namely methane, ethane, propane, n-butane and isobutane, and the lighter mono-olefins namely ethylene, propylene, butene-1, butene-2, and isobutene.

Still another object is to provide a process of the foregoing type for the recovery of anhydrous hydrogen chloride.

Still another object is to provide a process of the foregoing type for the recovery of anhydrous hydrogen fluoride.

Still another object is to provide a process of the foregoing type for the recovery of anhydrous hydrogen halide from hydrocarbon conversion reaction mixtures.

Numerous other objects will more fully hereinafter appear.

In the accompanying drawing there is portrayed diagrammatically one form of equipment for carrying out the present invention.

I have now found that anhydrous hydrogen halide may be recovered in substantially pure state from admixture with hydrocarbon by selective absorption in glacial acetic acid. The recovery process may be carried out in any conventional absorption equipment except that the absorption agent is glacial acetic acid. I have found that glacial acetic acid is a superior selective absorbing medium for anhydrous hydrogen halide and is essentially a non-solvent for the hydrocarbon.

The absorption is preferably carried out under pressures of atmospheric up to 100 pounds per square inch gage. However in certain instances it may be desirable to operate at pressures as high as 800 pounds per square inch gage, particularly when the products to be treated are at a high pressure and the resultant hydrogen halide-free products are to be used in subsequent high pressure processes. Temperatures as high as about 150° F. may be used. However it is preferable to operate at temperatures below 150° F. but above the freezing point (about 60° F.) of the acid.

My process is applicable primarily to the separation of anhydrous hydrogen chloride but may be applied to the other normally gaseous and therefore difficultly condensible hydrogen halides, namely, anhydrous hydrogen bromide and anhydrous hydrogen iodide.

My process is also applicable to the separation of anhydrous hydrogen fluoride which is a liquid at ordinary temperature and pressure.

The boiling points of the several hydrogen halides are as follows:

|  | °C. |
|---|---|
| HCl | −85 |
| HBr | −67 |
| HI | −35.5 |
| HF | +19.4 |

The boiling point of the glacial acetic acid is 118.1° C. (244.5° F.).

The boiling points of the several normally gaseous paraffin, mono-olefin and diolefin hydrocarbons apt to be encountered, either singly or in admixture, when dealing with separation of the normally gaseous anhydrous hydrogen halides are as follows:

|  | °C. |
|---|---|
| Methane | −161.4 |
| Ethane | − 88.3 |
| Propane | − 44.1 |
| N-butane | + 0.6 |
| Isobutane | − 10.2 |
| Ethylene | −103.9 |
| Propylene | − 48.0 |
| Butene-1 | − 6.7 |
| Butene-2 | + 1.0 |
| Isobutene | − 6.6 |
| Butadiene | + 1.0 |

The hydrocarbons apt to be encountered in admixture with hydrogen fluoride may be as follows:

|  | °C. |
|---|---|
| Isopentane | 28.0 |
| Neopentane | 9.5 |
| Pentene-1 | 30.0 |
| Isopropylethylene | 20.1 |

My invention may be applied to any reaction mixture or fraction thereof comprising an anhydrous hydrogen halide and one or more hydrocarbons which may boil closely thereto or substantially therefrom. Typical reactions to which my invention is applicable are: isomerization, alkylation, polymerization, halogenation, dehydrohalogenation, Friedel and Crafts reactions, cracking, reforming, etc.

The anhydrous hydrogen halide-hydrocarbon mixture may be extracted while in either liquid or vapor form, or while at a temperature such that both liquid and gaseous phases are present. Usually in the case of normally gaseous hydrocarbons and hydrogen halide the mixture will enter the absorbing unit in the gaseous form.

Referring now to the drawing, a feed of hydrocarbons to be converted may enter a reaction chamber 2 via line 1, anhydrous hydrogen chloride entering via line 3 if desired. The reaction in unit 2 may be an isomerization, alkylation or the like in which aluminum chloride is a catalyst and anhydrous hydrogen chloride is a promoter therefor.

The reaction mixture may leave unit 2 via line 4 and pass into separator 5 where separation of the normally gaseous materials from the higher boiling hydrocarbons may be effected by fractional distillation, fractional condensation, or the like, the bottoms leaving via line 6 and the gaseous overhead exiting via line 7.

The gaseous overhead consisting of hydrogen chloride and normally gaseous hydrocarbons may pass via line 8 into the absorbing unit 9. A similar mixture from an outside source may be introduced, if desired, via line 10.

In the absorber 9 the gaseous mixture passes upwardly countercurrently to downwardly flowing glacial acetic acid introduced via line 11. The hydrocarbon gases, essentially free from the hydrogen chloride, leave via line 12.

The HCl-enriched glacial acetic acid exits via line 13 and passes into stripping unit 14 where it is stripped in any suitable manner of its anhydrous hydrogen chloride which leaves via line 15. The stripped glacial acetic acid may leave via line 16 and be recycled via line 17 to the absorption unit 9.

*Example*

A gaseous vent mixture consisting of 50 per cent anhydrous hydrogen chloride and 50 per cent of light paraffin hydrocarbons essentially methane and ethane was passed through an absorption tower where it was contacted with glacial acetic acid (99%) at 120° F. using a pressure of 50 lbs. per sq. in. gage and a glacial acetic acid circulation of 55 gallons per 1000 cubic feet of the mixture fed. The absorption tower contained 40 trays. A 97% recovery of 98% pure anhydrous hydrogen chloride was obtained.

The advantages of my invention are numerous. Among them are the unusually clean-cut separation effected and the high yield of the anhydrous hydrogen halide in essentially pure form. Another advantage is the simplicity of the operation and the small investment in equipment required. Numerous other advantages will be apparent to those skilled in the art from the foregoing disclosure.

It will be understood that the absorption and stripping operations are conducted in a conventional manner except that a particular stream is being treated with a particular selective solvent. The stripping step will of course generally be conducted by heating the enriched acetic acid to a suitable temperature preferably substantially below the boiling point of pure acetic acid but sufficiently elevated to drive off substantially all the dissolved hydrogen halide content thereof.

By "glacial acetic acid" as used herein, I mean a product containing at least about 90 per cent by weight of the pure chemical acetic acid, the diluent being mainly water. I prefer to use acetic acid of 99 per cent by weight or greater purity in my invention.

I claim:

1. A process for the separation of a liquid mixture of an anhydrous hydrogen halide and a hydrocarbon having a boiling point close thereto, which comprises treating the said liquid mixture with liquid glacial acetic acid to effect a selective removal of liquid anhydrous hydrogen halide from said liquid hydrocarbon.

2. A process for the separation of a liquid mixture of anhydrous hydrogen halide and a light hydrocarbon which comprises treating said liquid mixture under absorbing conditions with liquid glacial acetic acid and under a pressure sufficient to maintain liquid phase and not greater than about 800 pounds gage and at temperatures above the freezing point of the acid to about 150° F. to selectively dissolve said hydrogen halide from said liquid light hydrocarbon.

3. A process for removing hydrogen chloride from a low boiling liquid hydrocarbon mixture, which comprises contacting a liquid hydrocarbon material containing anhydrous hydrogen chloride with liquid glacial acetic acid under conditions such as to effect a selective solution of said anhydrous hydrogen chloride in said liquid glacial acetic acid, and recovering from said treatment a liquid hydrocarbon material substantially free from hydrogen chloride.

4. A process for removing hydrogen fluoride from a low boiling liquid hydrocarbon mixture, which comprises contacting a liquid hydrocarbon material containing anhydrous hydrogen fluoride with liquid glacial acetic acid under conditions such as to effect a selective solution of said anhydrous hydrogen fluoride in said liquid glacial acetic acid, and recovering from said treatment a liquid hydrocarbon material substantially free from hydrogen fluoride.

KARL H. HACHMUTH.